United States Patent [19]
Leitz

[11] 4,110,042
[45] Aug. 29, 1978

[54] METHOD AND APPARATUS FOR PHOTOELECTRICALLY DETERMINING THE POSITION OF AT LEAST ONE FOCAL PLANE OF AN IMAGE

[75] Inventor: Ludwig Leitz, Wetzlar, Fed. Rep. of Germany

[73] Assignee: Ernst Leitz Wetzlar GmbH, Marl, Fed. Rep. of Germany

[21] Appl. No.: 856,585

[22] Filed: Dec. 1, 1977

Related U.S. Application Data

[63] Continuation of Ser. No. 671,103, Mar. 29, 1976, abandoned.

[30] Foreign Application Priority Data

Apr. 24, 1975 [DE] Fed. Rep. of Germany ....... 2518209

[51] Int. Cl.² .................................................. G01C 3/08
[52] U.S. Cl. ............................................ 356/4; 356/28; 356/156
[58] Field of Search ............................ 356/4, 28, 156

[56] References Cited

U.S. PATENT DOCUMENTS

| | | | |
|---|---|---|---|
| 3,482,107 | 12/1969 | Hock | 356/169 |
| 3,508,066 | 4/1970 | Agar | 356/28 |
| 3,781,110 | 12/1973 | Leitz et al. | 356/4 |

*Primary Examiner*—S. C. Buczinski
*Attorney, Agent, or Firm*—Gilbert L. Wells

[57] ABSTRACT

Method and apparatus for measuring distance using an optical correlator system containing at least one imaging optic, at least one optically active array, and at least a system of photoelectric detectors associated with the array preferably in the form of an optical grating structure wherein for the purpose of unambiguous distance or range determination by means of optical-geometric steps in the image region and/or in the Fourier space, different beam guidance systems are constructed so that for axial relative motion between object image and array output signals are generated at each photoelectric detector system associated with each beam guidance system, these output signals differing among themselves in frequency and hence (also) in phase. A comparison is made of the output signals and from the comparison the geometric image position of the principal maximum is determined with respect to the geometric positions of the secondary maxima.

14 Claims, 15 Drawing Figures

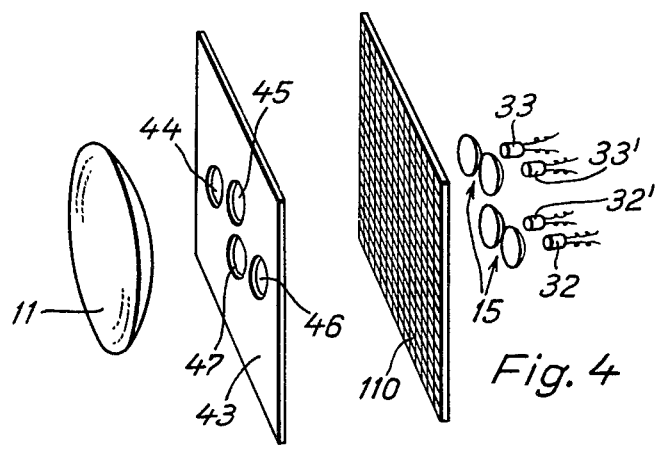
Fig. 4
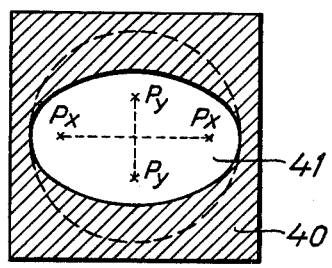
Fig. 4a
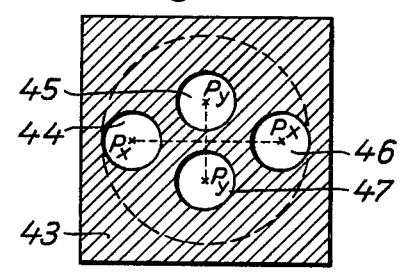
Fig. 4b
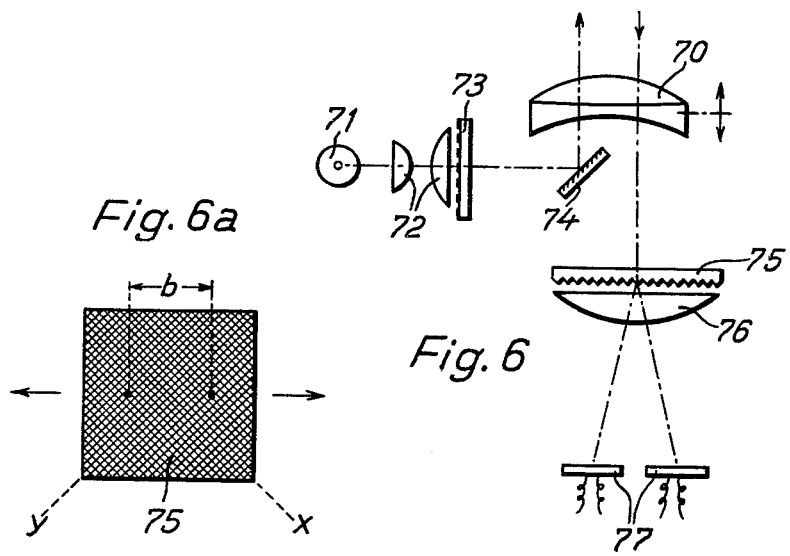
Fig. 6a
Fig. 6

METHOD AND APPARATUS FOR PHOTOELECTRICALLY DETERMINING THE POSITION OF AT LEAST ONE FOCAL PLANE OF AN IMAGE

This is a continuation of application Ser. No. 671,103 filed Mar. 29, 1976, now abandoned.

CROSS REFERENCES TO RELATED APPLICATIONS

Applicant claims priority under 35 U.S.C. 119 for application No. P 25 18 209.6, filed Apr. 24, 1975 in the Patent Office of the Federal Republic of Germany.

The disclosures of assignee's application Ser. Nos. 479,525 and 542,827, filed respectively Nov. 20, 1973 and Jan. 21, 1975, now both abandoned, are incorporated herein, along with the references cited therein, namely U.S. Pat. Nos. 3,856,401; 3,591,841; 3,546,467; 3,781,110; 3,486,032; 3,508,066; 3,320,852; and 3,198,952, and British Patent No. 1,249,302.

Application Ser. No. 479,525 discloses the state of the art of determining photoelectrically the position of at least one focus plane within an optical apparatus by having light fluxes traverse differing pupil sections of the reproducing optics, and modulating them in common by a spatial frequency filter and by splitting them in correspondence with the pupil sections.

Application Ser. No. 542,827 discloses the state of the art of measuring distance by projecting a structure image onto an object of measurement within the field of view of an optical image correlator and analyzing light fluxes returning from the object for amplitude of fundamental or harmonic with respect to object distance.

BACKGROUND OF THE INVENTION

The field of the invention is optics, measuring and testing the velocity or velocity/height with light detector. The present invention relates to a method and apparatus for photoelectrically determining the position of at least one focal plane of an image within an optical instrument, together with the imaging of at least one object onto a spatial frequency filter of an optical image correlator and the measurement and/or indication of the light fluxes leaving the spatial frequency filter.

Such a method and apparatus are described in U.S. patent application Ser. No. 479,525 of Leitz et al, wherein light fluxes passing through different pupil regions of the imaging optics are modulated in common by the spatial frequency filter and are split geometrically or physically depending on the pupil region or by additional modulation, and then are fed sequentially to a common photoelectric detector or simultaneously to separate ones, where the output signals are further processed for the purpose of control of an indication and/or adjustment system. Further, for the purpose of control with respect to algebraic sign of an indication and/or control system, the magnitude and/or the phase for the case of relative motion between spatial frequency filter and image and/or the frequencies of the incident electrical signals may be determined. Again, when making use of spatial frequency filter systems generating out-of-phase light fluxes, the light fluxes passing through the different pupil regions of the optics may be fed following their splitting as out-of-phase pairs in sequence or simultaneously to a common photoelectric pair of detectors where the output signals from each detector pair associated with a particular pupil region are applied to a particular push-pull amplifier, the output signals from the latter thereupon being compared for the purpose of algebraic signal control of an indication system and/or adjustment system regarding the magnitude and/or, if there is relative motion between spatial frequency filter and image, the relative phase or frequency.

It was found that the signals obtained from the method and apparatus of application Ser. No. 479,525 are well suited for measuring distance and for adjusting control signals. However, it was also found that the method and apparatus of application Ser. No. 479,525 unequivocally ascertains the position of the image plane or the distance within a limited range. This is so because there is a perodicity in the analysis signals, which leads to ambivalence. When there is motion together with the image plane within a range of position corresponding to half a signal period, then when this range is passed through there occurs only one signal maximum, and the position of the image plane may be uniquely ascertained. When a grating or grid is associated with two photoelectric detectors, and when this grating or grid traverses the imaging range of the optics, then the detector output signals for the grid or grating in the focal plane not only will be of maximum amplitude, but also they will be of phase. Depending on the direction of the displacement of the grid or grating from that plane along the optical axis, the phase of one or the other signal will lead. Now it is possible that within the image field of the object to be measured, and at some other distance, there will be another object which because of its radiation (for instance the tail lights of a motor vehicle) will deliver a higher signal amplitude than the object to be measured, and therefore, there will be spurious interpretation and measurement.

The above effects are the more disadvantageous the larger the range which one wishes to cover, and the more one passes from far distances to near distances.

SUMMARY OF THE INVENTION

Having in mind the limitations of the prior art as set forth above, it is an object of the present invention to make unequivocal measurements even for large ranges of measurement.

The object is achieved according to the present invention by creating different beam-guidance systems by optical-geometric steps in the image range and/or in the space wherein the aperture rays are affectable so that an axial motion of an object image with respect to the array, e.g. in the form of a grating structure generates an output signal at each photoelectric detector system associated with each beam guidance, these output signals each differing in frequency and hence in phase, and so that these two output signals are then compared and the geometric image position of the principal maximum is ascertained with respect to the geometric position of the secondary maxima.

Apparatus for carrying out the method of the present invention includes an optical correlator system containing at least one imaging optics, at least one optically active array in the form of a grid or grating structure, associated with at least a photoelectric detector system. At least two beam guidance and detection systems of different beam guidance elements are provided, which each deliver a periodic output signal depending on the relative position between object and optical correlator system, this dependency between signal periods and axial relative positions preferably being differentiable by different frequencies preferably related inharmonically and a comparison circuit follows the photoelectric detector systems associated with the beam guidance systems. This comparison circuit provides unequivocal position-determining electrical output signals by comparing the electrical signals obtained from the different beam guidance systems.

For the purpose of separating those signal components which hold no measurement information, each beam guidance system may be followed by a circuit which from two output signals of the corresponding detector systems forms a third filtered one that is applied as an input signal to the comparison circuit. An optically active structure is preferably constructed in the form of a grid or grating arrangement provided in azimuth or bearing with at least two different graduation periods or a grid or grating arrangement provided in two azimuths or bearings with different graduation periods, or a grid or grating arrangement with markings in four directions. Optically active means are further associated in the imaging system to generate at least two parallactic measurement angles associated with different bearing angles corresponding to the measurement coordinates of the grid or grating arrangement, or such an arrangement with markers splitting (the light beams) in four directions and with photoelectric detector systems so arrayed that the parallactic angles defined by the position of these detectors differ from one detector system to the other.

The optical imaging system also may be provided with at least one stop of which the opening(s) define(s) four pupil regions or pupils, of which the centers of gravity preferably will be equally spaced pairwise with respect to the optical axis of the system, the spacings of two pairs of pupils or pairs of pupil ranges being unequal (unequal parallaxes). The markers of the grid or grating structures may be of triangular or trapezoidal cross section in at least one direction. Their flank angles also may vary.

BRIEF DESCRIPTION OF THE DRAWINGS

The present invention is best described by reference to the appended drawings, wherein:

FIG. 4 is a schematic showing in side view of an embodiment of the present invention with different pupil centers of gravity;

FIGS. 4a and 4b show in plan view embodiments of stops useful in FIG. 4;

FIG. 6 is a diagrammatic plan view of an embodiment of the present invention in combination with a projector; and FIG. 6a is a plan view of the grid or grating of FIG. 6.

DESCRIPTION OF THE PREFERRED EMBODIMENTS

Figure 1:
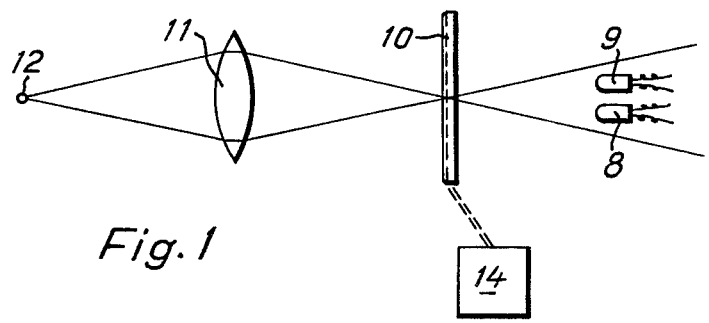
FIG. 1 is a diagrammatic showing in plan view of the synthesis of signal maxima.

With particular reference to FIG. 1, objective 11 images an object 12 in a plane in which amplitude grid 10 is movably located and in which it is made to move in oscillatory manner parallel to the plane of the drawing and orthogonally to the optical axis by a generator 14. The grid is followed by two photoelectric detectors 8 and 9 which, because of their spatial location, are associated with different pupil regions of the objective.

For the grid position shown, both detectors supply alternating signals of maximum amplitude and the same phase. When the spacing between the grid and the objective is changed, the signal amplitudes decrease continuously and there is a simultaneous phase shift of the output signals at detectors 8 and 9, the direction of displacement of the focal plane determining which signals lead. Basically the phase shift may traverse even several signal periods. In every case, the signal frequency is determined by the grid or grating constant and by the speed of the motion of grid or grating.

The present invention is based on the concept that for distance measurements, enough information is given by the signals for one coordinate direction of the viewing field whenever the change in distance of the object shifts the focal plane within the range of a signal phase shift between $+\pi/2$ and $-\pi/2$. Beyond this there are ambiguities which must be eliminated.

Since only one coordinate direction of the viewing field is being used to obtain the measurement signal, another may be used to obtain definition of the auxiliary signals. This especially succeeds when grids or gratings of different structural constants (periods) are associated with the two coordinate directions. In such a case the output signals from the photoelectric detectors assigned to the different coordinate directions differ in frequency, and the position of the focal plane, which is defined by the maximum output signals of the detectors for the measurement coordinate directions, is reliably determined from the relative phase of the mutually different signals. When, for instance, grids with structural constants in the ratio of 1:10 are used, then starting from maximum measurement signals, signals are encountered in the same phase relationship to the auxiliary signals only after 10 periods of the latter. Thus the appropriate selection of grids or gratings allows increasing the range of unambiguity, and hence one may increase in this manner the distance range subject to measurement.

Figure 2A:
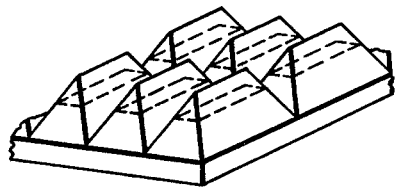
FIGS. 2a – 2c are perspective views of embodiments of grid or grating useful in the system of FIG. 2.
Figure 2B:
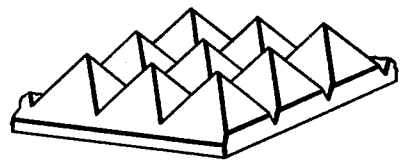
Figure 2C:
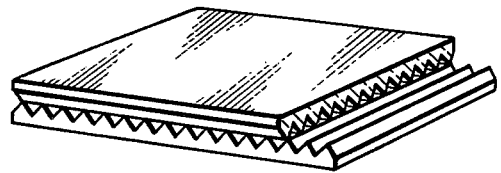
Figure 2:
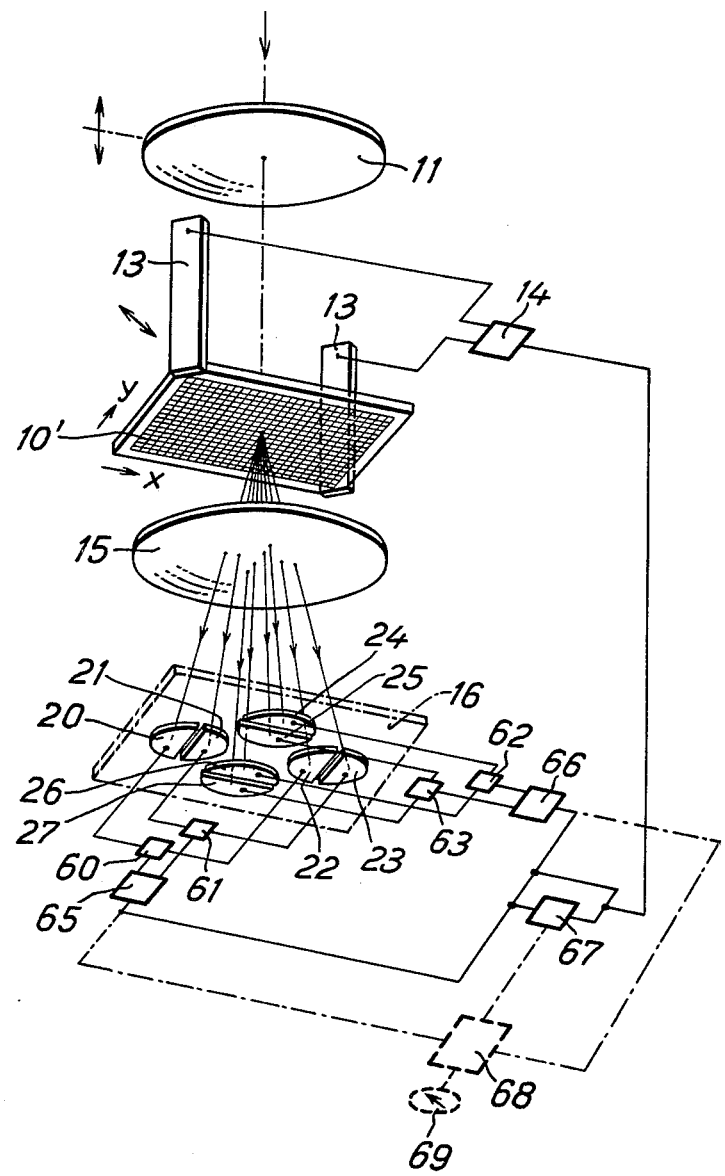
FIG. 2 is a schematic side view of the novel system of the present invention with grids of gratings of spatial periods varying in two coordinates.

FIG. 2 shows a corresponding embodiment. The object, not shown, is imaged by objective 11 onto a grid 10' which is provided with markers of triangular cross section and this grid is divided along two orthogonal coordinate directions $x$ and $y$ and the structural periods along those directions are different. This grid is supported by two flexural vibrators 13 diagonally mounted in it, and it is controlled by these using a generator 14 so as to oscillate obliquely to the two coordinate directions $x$ and $y$. Grid 10' is followed by a field lens 15 which images the entrance pupil of objective 11 in a plane 16. Four pairs of photoelectric detectors 20 through 27 are mounted in this plane. The grid splits the entrance pupil into four exit pupils and the images of the latter fall each on one pair of detectors. In conformity with the disclosure of U.S. patent application Ser. No. 479,525, these detectors are so shaped and positioned that every time two of them receive light from different parallactic angles from the object, corresponding to a right hand and left hand or upper and lower part of the entrance pupil, the signals from detectors 20, 22 and 21, 23 and 24, 26 and 25, 27 respectively are out of phase. They are fed to corresponding push-pull amplifiers 60, 61, 62 and 63, where the input signals are summed and simultaneously the in-phase components and spurious signals are eliminated. The output signals so obtained are fed pairwise corresponding to the coordinate directions associated with them to a phase comparator 65 or 66, of which the output signals depend on the particular phase difference of the input signals, and are proportional to the latter or to an angular function corresponding to these input signals. When there is a change in the object distance, there is in the second case an output signal of periodic nature for each coordinate direction, but as called for by the present invention, with different relationships between change in distance and magnitude of the period. The two signals are applied to a ratio-former 67 which compares the instantaneous values and of which the output signals are used as characteristics of the period of the above-described distance signal. In addition, the signal from at least one coordinate is used for measurements within the period, namely by using its phase. Also, by using a reference signal from the oscillation of the grid or grating, and a phase-sensitive rectifier 68 shown in dashed lines, one may derive a signal from the initial outputs of push-pull amplifiers 60 through 63, which is proportional to the shift of the object orthogonally in the optical axis (display 69). The components 65, 66, 67, 68 and 69 are common electronic components available on the market (i.e. comparators, operational amplifiers etc.).

Again, making use of this reference signal, output signals may be obtained from the scanning motion by comparison with at least one of the output signals from amplifiers 60 through 63 which correspond to the change in position of the object orthogonally to the optical axis.

Grid 10' can be constructed in many ways. It is possible to achieve the different structural periods associated with the two coordinate directions by generating a hip-roof-like grid or one with a truncated hip-roof-like shape with non-square marker baselines. FIG. 2a shows an embodiment wherein the dashed lines define the outer surface of the grid executed as a truncated, hip-roof-like structure. FIG. 2b shows an embodiment in which the valleys caused by the markers are of different depths corresponding to the coordinate directions because the markers of square bases show different flank slopes in the two coordinate directions. FIG. 2c shows a grid built up from the single coordinate prismatic gratings with different grating constants, these two gratings being relatively rotated by 90° with respect to their grating directions.

In view of what has been described so far, grids with two different structural constants according to coordinate directions are used. It must be noted, however, that the signals required for determining position and of different frequencies may also be obtained by simultaneously imaging object 12' on two grids associated with the same coordinate direction but provided with different structural constants, these grids being near one another and if desirable obtaining their light from a common optic.

Figure 3:
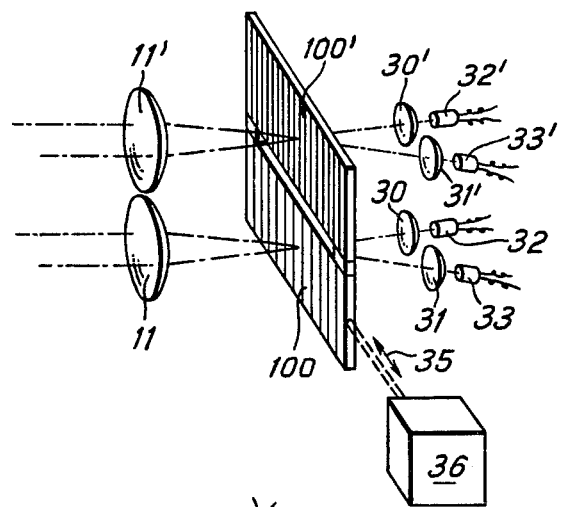
FIG. 3 is a schematic side view of an embodiment of the present invention with grids or gratings oriented along one coordinate.

Again it is possible to design the grid following the objective for one coordinate and to image the object through a second objective on an auxiliary grid or grating, both measuring grid and auxiliary one meeting the above cited conditions and being associated with different or even the same coordinate directions, depending on the direction(s) determined by their markers. This is illustrated in FIG. 3. Objective 11 images the object (not shown) on a prismatic grating 100, which is followed by condensers 30, 31, and photoelectric detectors 32, 33, the output signals of the latter being out of phase on account of the geometry of grating 100. A corresponding arrangement is shown above, its components being denoted by apostrophes, and the same considerations apply to this arrangement as to the lower one. The two objectives 11, 11' are as close to one another as possible and coupled together, so that they will carry out jointly any spatial shift. The structural constants of the two grids 100 and 100' are different, and therefore the output signals from photoelectric detectors 32 and 33 will be of a different frequency than those from detectors 32' and 33'. Omitted from the drawing are drive means which move the grids synchronously in oscillation, as shown by double arrow 35. The grids are preferably actuated by generator 36. Signal analysis takes place in the manner described above.

Figure 3A:
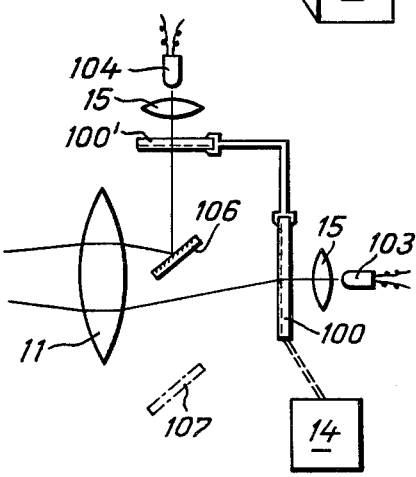
FIGS. 3a and 3b are diagrammatic showings in plan view of the present invention with grids or gratings oriented along one coordinate.

This arrangement allows for variations. If enough light is available, objective 11 also is used to image onto both grids or gratings 100 and 100' by inserting a beam splitter of suitable geometric or physical nature between the objective and grid 100. The proportions of light flux assigned to the grids or gratings may be unequal, because it is the phase which matters most for the signals generated by auxiliary grid 100', these signals being used for defining the position of the image plane. FIG. 3a illustrates this case. As seen, a geometric beam splitter 106 follows objective 11 and guides the light fluxes corresponding to one-half of the pupil of objective 11 onto grid or grating 100', while the light flux from the other pupil half goes to grid or grating 100. Again, both grids are rigidly and mechanically ganged together. Their prisms are the same as regards structural period, but different with respect to their flank angles, and they are driven by generator 14 in the direction normal to the plane of the drawing. In lieu of splitter 106, a physical splitter denoted by 107 and indicated in dashed lines may also be used.

Figure 3B:
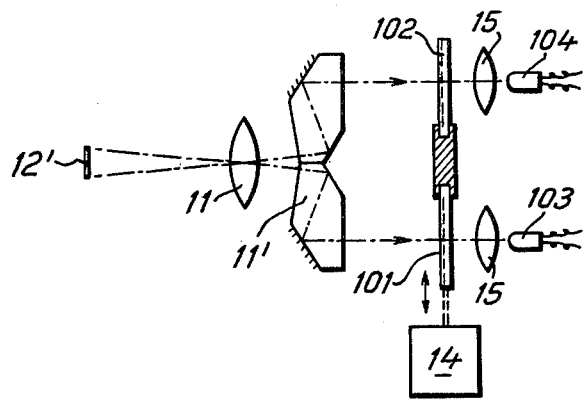

Again, it is possible to associate different pupil regions with the two grids or gratings, as indicated in the illustration of FIG. 3b. Object 12' is imaged by objective 11 followed by double wedge 11' and the two grids or gratings 101 and 102, which are of different structural constants, are associated with different pupil halves of objective 11. They are rigidly ganged together and are moved by generator 14 in a direction normal to the plane of the drawing. The following photoelectric detectors 103 or 104 in conjunction with the light fluxes reaching them through field lenses 15 deliver output signals differing in frequency depending on the design of the grids or gratings. Processing of these signals is similar to the description provided above.

If, however, it is desirable not to lose the measurement signals and the auxiliary ones defining these as obtained from two coordinate directions, then this goal may be achieved also when using grids or gratings designed with the same structural constants in both coordinate directions provided pupil regions with different center of gravity spacings are assigned to the coordinate directions. This may be achieved for instance by using an objective with elliptic apertures, or by associating a corresponding stop with the objective. Examples of such stops are shown in FIGS. 4a and 4b, FIG. 4 showing the fundamental design of the entire system.

In FIG. 4a a stop 40 with oval hollow 41 is associated with objective 11 and hollow 41, because of its shape, determines the position of pupil centers of gravity P$x$ and P$y$. With regard to the illustration of FIG. 4b, stop 43 is provided with four apertures 44 through 47 and of circular shape, the centers of which coincide with the centers of gravity P$x$ and P$y$ respectively. As seen in FIG. 4b, there are different spacings between the P$x$ pupil centers of gravity and also between the P$y$ centers of gravity and they are associated with different parallactic angles, so that, in conjunction with a grid or grating 110 of the same periodic constant in both coordinate directions, the pupil centers of gravity determine electrical scanning signals of different frequencies, the higher frequencies corresponding to the lesser spacing in pupil centers of gravity. It is not absolutely necessary that the pupil centers of gravity of one coordinate direction be the same distance from the optical axis of the system.

Stop 43 is dispensed with provided the photoelectric detectors are so designed and mounted that they are impinged upon by beam components which pass through pupil regions with different spacings in their centers of gravity.

Figure 5:
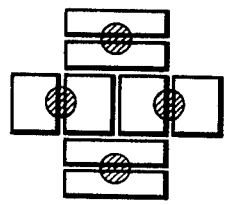
FIG. 5 is a plan view of a detector array.
Figure 5A:
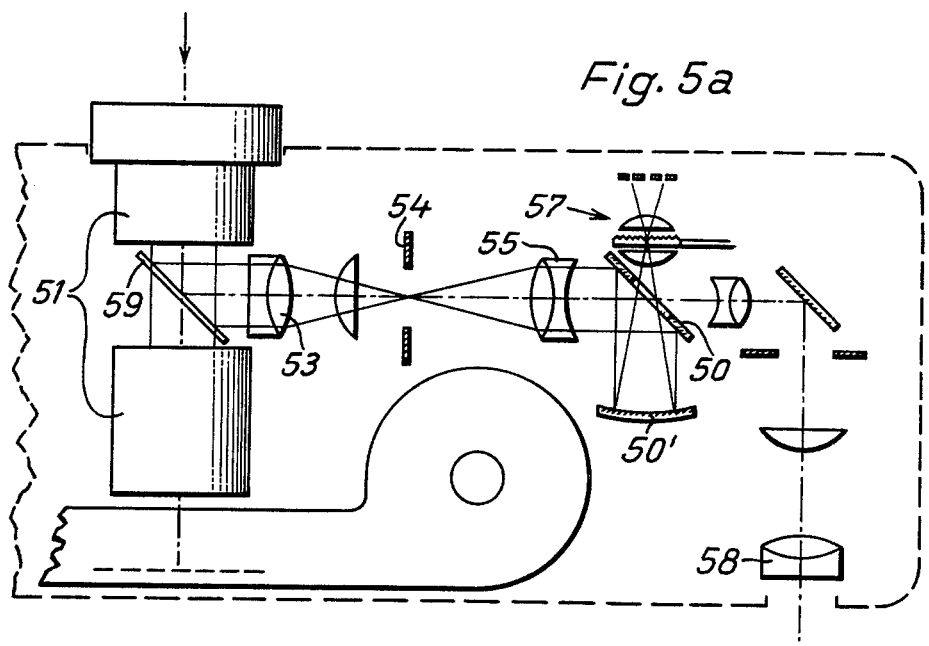
FIG. 5a is a diagrammatic side view with the detector array of FIG. 5 mounted in a camera.

FIG. 5 shows an example of such a detector array, and a special application in a camera is shown in FIG. 5a. The shaded fields shown in FIG. 5 correspond to the beam components that are guided on to the viewer and therefore are unavailable for measurement purposes.

A splitter or folding mirror 59 is located between the members of camera objective 51 in FIG. 5a, which deflects at least part of the incident light flux laterally into the viewer beam. Optical elements 53, 55 together with stop 54 are so designed that the object is imaged on an annular mirror 50 through the aperture of which passes the beam for the viewer with ocular 58. The light beam incident on annular mirror 50 is reflected on a concave mirror 50' from which it passes through the aperture of annular mirror 50 to an optical system 57, the latter being designed as explained above. The figure shows that the new arrangement can be compactly used in a camera.

The present invention so far described is based upon the concept that the object to be measured is endowed with sufficient structural nature to ensure adequate measurement signals. But there are cases when this is not so. It has already been proposed to project a structure onto the object to be measured, where this structure coincides as regards the image of its structural period in the plane of the grid or grating with the structural period or constant of the grid or grating as disclosed in U.S. patent application Ser. No. 542,827. This method may also be applied within the scope of the present invention when the grid or grating providing the projected structure is constructed as a crossed grating or grid with different structural constants in two coordinate directions of the image plane, and when a sensor grating or grid, preferably a pyramidal one, is provided which corresponds in its different structural periods or constants to the image of the structure of different structural constants. As already mentioned above, this grid or grating is driven into oscillation transversely to the coordinate directions and the light from the image region then is guided to one pair of detectors each for each coordinate direction. This gives rise to multiply crossing rhombic beam geometries in the object region, which are caused by the projected structure and the virtual image of the grid or grating. In order to keep the arrangement simple if there is only one given parallactic baseline, in principle, two baselines for instance in direction of altitude and bearing are also feasible, both crossed grids or gratings are mounted rotated by less than 45° with respect to the baseline in the image plane, so that one component of the baseline and of the oscillation of the grid or grating is effective for both coordinate directions.

When such an arrangement is used, a common objective serves for both the projection system and the sensor, preferably separate centers of gravity for pupils and parallaxes for projecting the grid or grating and the sensor being generated by geometric beam splitting in the vicinity of the entrance pupil. Such an arrangement is illustrated in FIGS. 6 and 6a. A common objective serves both the projection system consisting of light source 71, condenser 72, grid or grating 73 providing the projected structure and deflecting mirror 74 and of an oscillating grid or grating (indicated by arrow) 75, a field lens 76 and a photoelectric detector system 77 acting as sensor, only half of the objective being used each time. Both the grid or grating for the sensor (FIG. 6a) and that for the projection system are mounted so that the coordinate directions defined by them are oblique to the direction of oscillation of grid or grating 75. The parallactic baseline is denoted by $b$.

It is readily seen that the grids or gratings used in the individual examples may be replaced with others if suitably adapted, without thereby departing from the scope of the invention.

One should metion in this respect that the method described above, or the various instrumentations for its implementation, also may be applied to eye refractometry.

I claim:
1. In a method for measuring the relative distance between an object emanating light fluxes and a reference system using an optical correlator system containing at least one imaging optic having at least an image plane and at least an image space, at least one screen provided with at least one optically active structure and at least one photoelectric detector system associated with said optically active structure for determining unambiguously distance and range, the improvement comprising:
    (a) utilizing at least two optically active structures provided with optically effective properties differing from structure to structure, to form a plurality of beam guiding systems;
    (b) locating said structures within said image space for guiding said light fluxes into a plurality of directions and for generating distinct modulation characteristic light fluxes;
    (c) associating with each of said beam guiding systems one of said photoelectric detector systems, each of which generates at least one output signal in response to a relative axial motion between an image of said object and said structure, and in dependence upon the distance between said object and said structure of said reference system according to said distinct modulation characteristic light fluxes impinging upon said photoelectric detector systems according to said differing optically effective properties of said structures, said output signals differing from one another in frequency and phase and having each a maximum in signal ampli- tude at the focusing of said object in said image plane of said imaging optic; at the defocusing of said object, said signal amplitudes diminishing; and (d) comparing said output signals with respect to their phases and determining from said comparison the position of said structure with respect to said imaging optic characterized by said maxima of said signal amplitudes.

2. In an apparatus for the no-contact measurement of the relative distance between an object emanating light fluxes without special markers thereon and a reference position, said apparatus using an optical correlator system containing at least one imaging optic with at least one image plane, at least one screen provided with at least one optically active structure disposed in the proximity of said imaging plane and at least one photoelectric detector system, said imaging optic having an aperture and producing an image of said object upon said optically active structure, said structure effective as a spatial frequency filter splitting said image projected thereon into a plurality of object-image components localized in defined aperture image planes, said photoelectric detector system having at least two detectors associated with said optically active structure and generating, in response to a relative axial motion between said image of said object and said structure, output signals in push-pull relationship to one another having a frequency component proportional to said motion, the improvement comprising (a) at least two optically active structures produced by dividing said screen by divisional rulings differing from structure to structure and located at least in the proximity of said image plane of said imaging optic and guiding said light fluxes emanating from said image of said object into a plurality of directions, defining a plurality of beam guiding systems and effecting a plurality of modulation characteristic light fluxes; each of said beam guiding systems being associated with one of said photoelectric detector systems, each of which generates first output signals upon impingement of said modulation characteristic light fluxes and in responsee to a relative axial motion and in dependence upon the distance between said image of said object and said structure, said first output signals differing from one another in frequency and phase according to said modulation characteristic light fluxes; and (b) a comparison circuit connected to each of said photoelectric detector systems generating from a comparison of phases of the respective ones of said first output signals, second electrical output signals unambiguously indicating - even over several signal periods - the relative position of said structure with respect to said image.

3. The apparatus of claim 2, wherein for the purpose of separating components disturbing signal analysis from said first output signals, each of said photoelectric detector systems is followed by a first circuit for forming a filtered signal from said first output signals of said photoelectric detector systems, said filtered signals applied as input signals to said comparison circuit.

4. The apparatus of claim 3, wherein said structure is a grating arrangement periodically divided with first and second rulings, said rulings being oriented in a common direction.

5. The apparatus of claim 4, wherein said grating arrangement comprises a plurality of single coordinate gratings oriented according to a given coordinate direction.

6. The apparatus of claim 3, wherein said structure is a grating arrangement periodically divided with first and second rulings, each of said rulings being oriented in different directions.

7. The apparatus of claim 2, wherein said structure is a grating arrangement periodically divided with said rulings splitting light into four directions and comprising further optical means arranged in front of said grating arrangement for defining first and second parallactic angles associated with said first and second rulings.

8. The apparatus of claim 7, wherein said further optical means is at least one stop supplied with at least one aperture defining a pupil region; at least four points in said region or four areas therefrom being selected and forming strong points, said points or areas being positioned pairwise in the same distance from the optical axis of said imaging optic, the distance of two pairs of said points or pairs of said areas being unequal.

9. The apparatus of claim 2, wherein said structure is a grating arrangement periodically divided with said rulings splitting light into four directions and wherein said photoelectric detector system associated therewith and arranged behind said grating arrangement is set to define parallactic angles; said setting varying from each of said beam guiding systems to the other of said beam guiding systems and defining a plurality of parallactic angles.

10. The apparatus of claim 9, wherein said rulings of said grating arrangement are of triangular cross section at least in one direction.

11. The apparatus of claim 9, wherein said rulings of said grating arrangement are of trapezoidal cross section at least in one direction.

12. The apparatus of claim 2, wherein said rulings of said grating arrangement exhibit flanks being pairwise of different inclination angle.

13. The apparatus of claim 2, wherein said grating arrangement has different groove depths between its rulings.

14. The apparatus of claim 2, in further combination with at least one projection system projecting a grating structure onto said object.

* * * * *